(12) United States Patent
Watanabe

(10) Patent No.: US 6,307,850 B1
(45) Date of Patent: Oct. 23, 2001

(54) CDMA RADIO TRANSMISSION SYSTEM

(75) Inventor: Masatoshi Watanabe, Kawasaki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 08/994,942

(22) Filed: Dec. 19, 1997

(30) Foreign Application Priority Data

Dec. 27, 1996 (JP) .................................................. 8-356747

(51) Int. Cl.[7] .................................................. H04L 27/30
(52) U.S. Cl. .............................................. 370/335; 375/149
(58) Field of Search ...................................... 370/335, 342, 370/465, 468; 375/200, 206, 140, 142, 147, 149

(56) References Cited

U.S. PATENT DOCUMENTS

| | | | |
|---|---|---|---|
| 5,305,349 | * 4/1994 | Dent | 370/209 |
| 5,490,165 | * 2/1996 | Blakeney, II et al. | 375/205 |
| 5,619,524 | * 4/1997 | Ling et al. | 375/200 |
| 5,644,590 | * 7/1997 | Sugita | 375/200 |
| 5,754,599 | * 5/1998 | Ling et al. | 375/340 |
| 5,822,359 | * 10/1998 | Bruckert et al. | 375/200 |
| 5,898,665 | * 4/1999 | Sawahashi et al. | 370/342 |

FOREIGN PATENT DOCUMENTS

| | | |
|---|---|---|
| 0693830 | 1/1996 | (EP) . |
| 2290010 | 12/1995 | (GB) . |
| 09008770 | 1/1997 | (JP) . |
| 93009622 | 5/1993 | (WO) . |

OTHER PUBLICATIONS

Kim et al. "A Coherent Dual–Channel QPSK Modulation For CDMA Systems" IEEE 5/96, 1848–1852.*

Fukasawa et al. "Wideband CDMS System for Personal Radio Communications" IEEE 4/96, 116–123.*

Korean Office Action dated Feb. 28, 2000, with translation.

Proceeding of IEEE 4th ISSSTA, Sep. 22, 1996, Adachi F., et al., "Coherent DS–CDMA: promising multiple access for wireless multimedia mobile communications", pp. 351–358.

Higashi et al., "Performance of Coherent RAKE Detection Using Interpolation on DS/CDMA," Technical Report of IEICE AP 94–74, RCS 94–98, Oct. 1994, pp. 57–62.

European Search Report, dated Sep. 27, 2000, with Annex.

* cited by examiner

Primary Examiner—Chau Nguyen
Assistant Examiner—Jasper Kwoh
(74) Attorney, Agent, or Firm—Stevens, Davis, Miller & Mosher, LLP

(57) ABSTRACT

A CDMA receiving apparatus which can perform coherent detection in multi-code transmission with high accuracy by using a pilot signal, and can be easily produced. The apparatus demodulates data multi-code-transmitted through a plurality of channels, wherein in each of the systems for demodulating reception signals of the respective channels, there are provided spread code generating units for generating spread codes allocated to the channels, spread code generating units for generating spread codes in which a pilot signal is spread, and despreading units for despreading the reception signal on the basis of the spread codes generated by those spread code generating means, so that the transmission condition of the line is estimated on the basis of the pilot signal extracted by despreading and coherent detection of the reception signals of the respective channels is corrected on the basis of the result of the estimation. Because the transmission condition of the line can be estimated by the respective systems, information of the transmission condition need not be distributed to the respective systems.

8 Claims, 8 Drawing Sheets

CDMA RADIO TRANSMISSION SYSTEM

BACKGROUND OF THE INVENTION

1. Field of the Invention

The present invention relates to a CDMA (Code Division Multiple Access) radio transmission system used for mobile communication, or the like, and particularly to a CDMA receiving apparatus in which coherent detection performance in multi-code transmission is improved by a hardware configuration which can be produced easily.

2. Description of the Related Art

In CDMA system mobile communication, spread-spectrum communication, in which the spectrum of an information signal to be transmitted is spread by using a spread code to a sufficiently wide band compared with the original information band width, is performed, so that multiple access based on the allocation of the spread code to users, that is, code division multiple access is performed.

Further, in digital communication, it is known that coherent detection using the same carrier frequency both in transmission and in reception to perform modulation and demodulation of a signal has more excellent error-rate characteristic than differential detection for obtaining the phase difference in reception wave at a distance of one symbol as a detection system.

In the coherent detection, however, if there is fading, the error-rate characteristic is deteriorated by the phase change after reception. In the case of PSK (phase shift keying) modulation, demodulation data may be rotated on a phase plane due to the phase change or may occupy a phase point different from the original phase point.

In order to solve the problem in such coherent detection, there is used a system in which the transmission side transmits a known signal (pilot signal) contained in transmission data to the reception side so that the reception side estimates the condition of line on the basis of the result of reception of the pilot signal and corrects the distortion of the transmission signal due to fading.

As shown in FIG. 8, a CDMA transmitting apparatus using this system comprises: a switch 86 for outputting a transmission data series or a pilot signal selectively; a spread code generator 83 for generating a spread code to be allocated; a spreader 82 for spreading data to be transmitted by using the spread code; a transmission RF section 87 for up-converting transmission information into a radio-frequency signal; and an antenna 88 for transmission.

In this transmitting apparatus, when the switch 86 connected to the lower side is changed over to the upper side at regular intervals, the pilot signal is inserted into the transmission data series at regular intervals. The transmission information containing the pilot signal inserted therein is spread by the spreader 82 on the basis of a spread code of the code #0 generated by the spread code generator 83 and is up-converted into a radio-frequency signal by the transmission RF section 87, so that the radio-frequency signal is transmitted through the antenna 88.

In the reception side, after the frequency of the reception signal is down-converted, the reception signal is despread on the basis of the spread code of the code #0 and, further, the channel condition is estimated on the basis of the relation between the result of the demodulation of the pilot signal inserted in the reception signal at regular intervals and the original phase position of the pilot signal. While correction is performed on the basis of the result of the estimation, coherent detection of data continued to the pilot signal is performed.

According to this system, because the pilot signal is inserted into the reception data series at regular intervals, correct demodulation can be performed regardless of the time change of the transmission condition due to the fading.

The article "Performance of Coherent RAKE Detection using Interpolation on DS/CDMA" by Higashi et al., described in IEICE Technical Report, October 1994, has proposed a decision feedback interpolation type coherent detection system using a small number of pilot symbols to improve accuracy in estimation of a channel transmission function in DS/CDMA mobile radio communication and to make it possible to follow high-speed fading. According to this system, a pilot symbol is periodically inserted in an information symbol to be transmitted to thereby estimate the transmission function of the transmission system on the basis of both decision feedback and interpolation, so that the error rate can be reduced.

Further, in CDMA, a system of "multi-code transmission" in which a plurality of channels, that is, a plurality of spread codes are allocated to one user and information data is divided into a plurality of channels to be transmitted is known as a system for transmitting information over an information transmission speed per channel (spread code).

Also in the case of multi-code transmission, use of the pilot signal has been proposed to improve the coherent detection performance of each channel. There has been discussed a system in which a pilot channel for transmitting only a pilot signal is provided newly or the pilot signal is transmitted while being shifted in time for every channel, and so on.

SUMMARY OF THE INVENTION

From another point of view, an object of the present invention is to provide for coherent detection of the pilot signal in multi-code transmission with high accuracy.

In the CDMA receiving apparatus according to the present invention, first spread code generating means for generating spread codes allocated to the channels for demodulation, second spread code generating means for generating spread codes in which a pilot signal is spread, and despreading means for despreading the reception signal on the basis of the spread codes generated by the first and second spread code generating means are provided in each of systems for demodulating reception signals of respective channels so that the channel condition is estimated on the basis of the pilot signal extracted by despreading and coherent detection of the reception signals of the respective channels is corrected on the basis of the result of the estimation.

Therefore, the channel condition can be estimated by each system individually, so that information of the channel condition need not be distributed to the respective systems. As a result, the hardware configuration can be simplified.

DESCRIPTION OF THE PREFERRED EMBODIMENTS

Embodiments of the present invention will be described below with reference to the drawings.

(First Embodiment)

The CDMA receiving apparatus according to the first embodiment is a receiving apparatus in multi-code transmission of the type in which transmission is performed with a pilot signal spread on the basis of one spread code.

Figure 2:
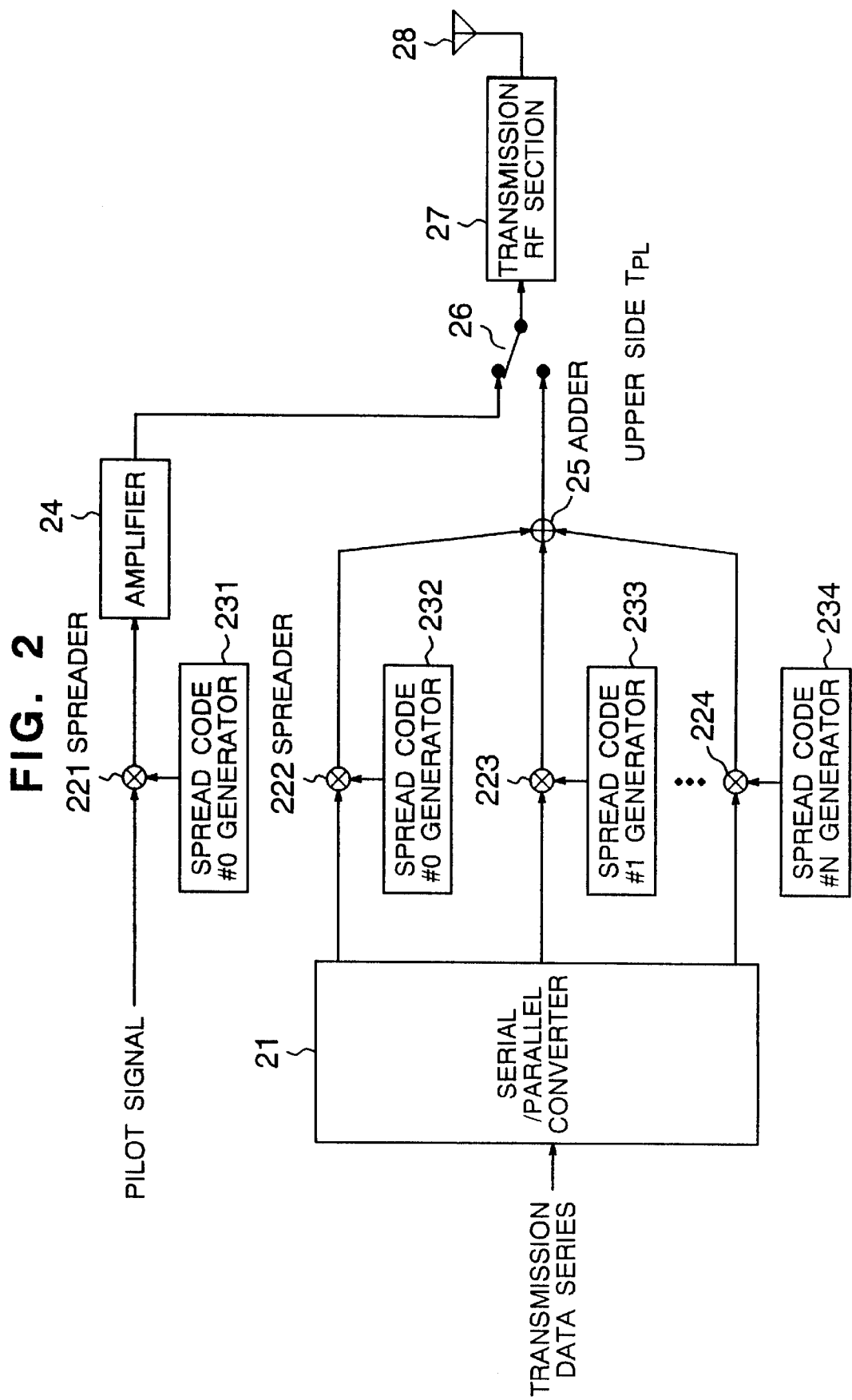
FIG. 2 is a block diagram showing a configuration of a transmitting apparatus for performing multi-code transmission according to the first embodiment.

As shown in FIG. 2, this type transmitting apparatus comprises: a serial/parallel converter 21 for distributing a transmission data series to respective channels; a spread code generator 231 for generating a spread code #0; spread code generators 232, 233 and 234 for generating spread codes allocated to the different channels respectively; a spreader 221 for spreading a pilot signal on the basis of a spread code generated by the spread code generator 231; an amplifier 24 for amplifying the output of the spreader 221; spreaders 222, 223 and 224 for spreading respective channel information data output from the serial/parallel converter 21 on the basis of spread codes generated by the spread code generators 232 to 234 respectively; an adder 25 for adding up the outputs of the spreaders 222 to 224; a switch 26 for selecting an output of the amplifier 24 in a pilot signal transmission region and selecting an output of the adder 25 in an information data transmission region to output the pilot signal and the transmission data; a transmission RF section 27 for up-converting the frequency of the transmission signal into a radio frequency; and an antenna 28 for transmission.

Figure 3:
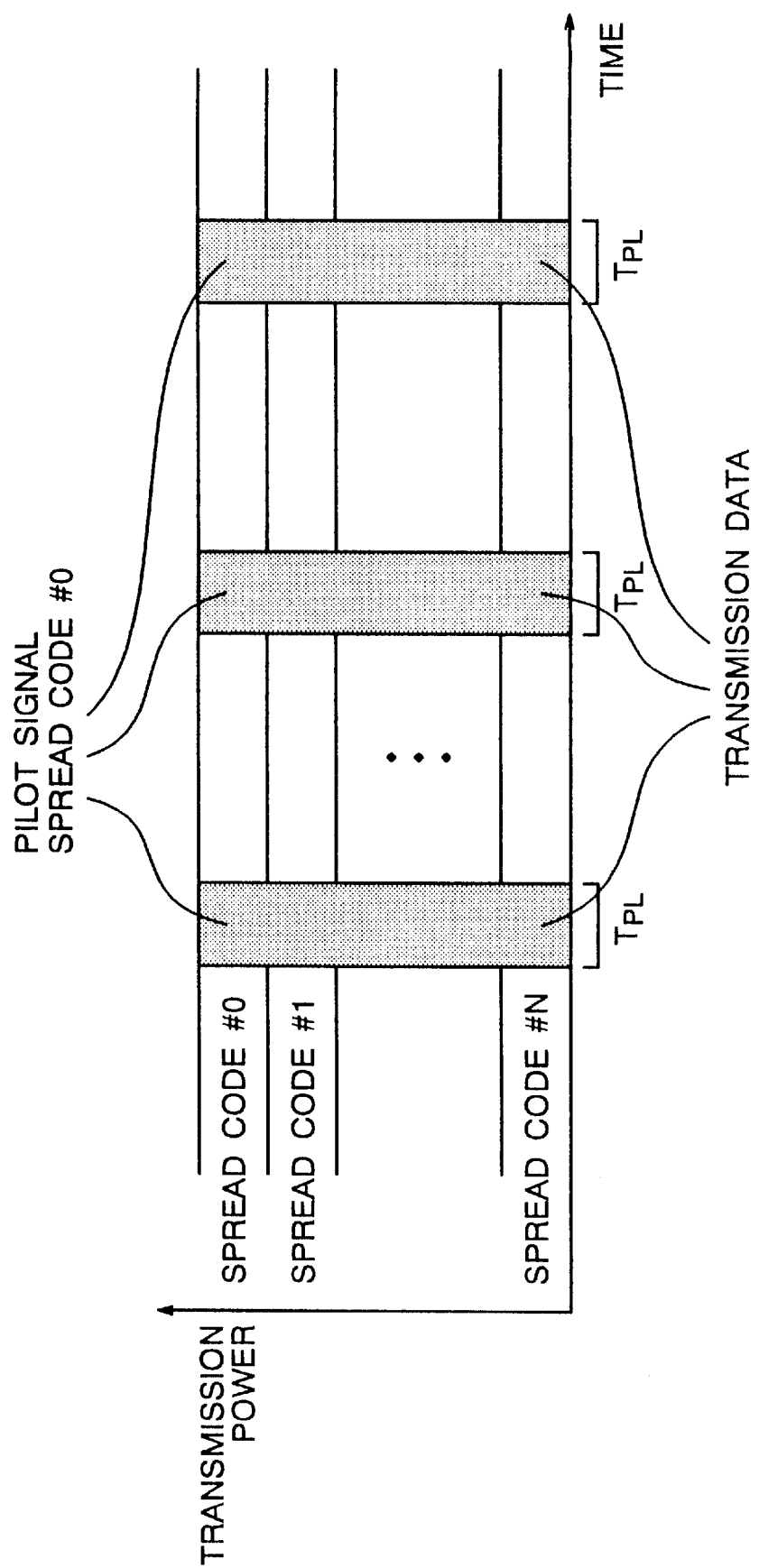
FIG. 3 shows a channel format for multi-code transmission in the first embodiment.

FIG. 3 shows a channel format for multi-code transmission in this transmitting apparatus.

In this transmitting apparatus, an input transmission data series is converted into parallel data of a number corresponding to the number (N+1) of channels by the serial/parallel converter 21, so that the parallel data are output to the channels respectively. The spreaders 222 to 224 spread signals output from the serial/parallel converter 21 correspondingly to the channels on the basis of spread codes generated by the spread code generators 232 to 234. Succeedingly, the respective outputs of the spreaders 222 to 224 are added up by the adder 25.

On the other hand, the spreader 221 spreads a pilot signal on the basis of a spread code #0 generated by the spread signal generator 231, so that the spread pilot signal is amplified by the amplifier 24.

The switch 26 selects the pilot signal output from the amplifier 24 in each pilot signal transmission region ($T_{PL}$) shown in FIG. 3 and supplies the pilot signal to the transmission RF section 27. Further, the switch 26 selects the added transmission data output from the adder 25 in each information data transmission region and supplies the transmission data to the transmission RF section 27. The transmission RF section 27 up-converts the frequency of the input signal series into a radio frequency, so that the signal thus modified is transmitted through the antenna 28.

Figure 1:
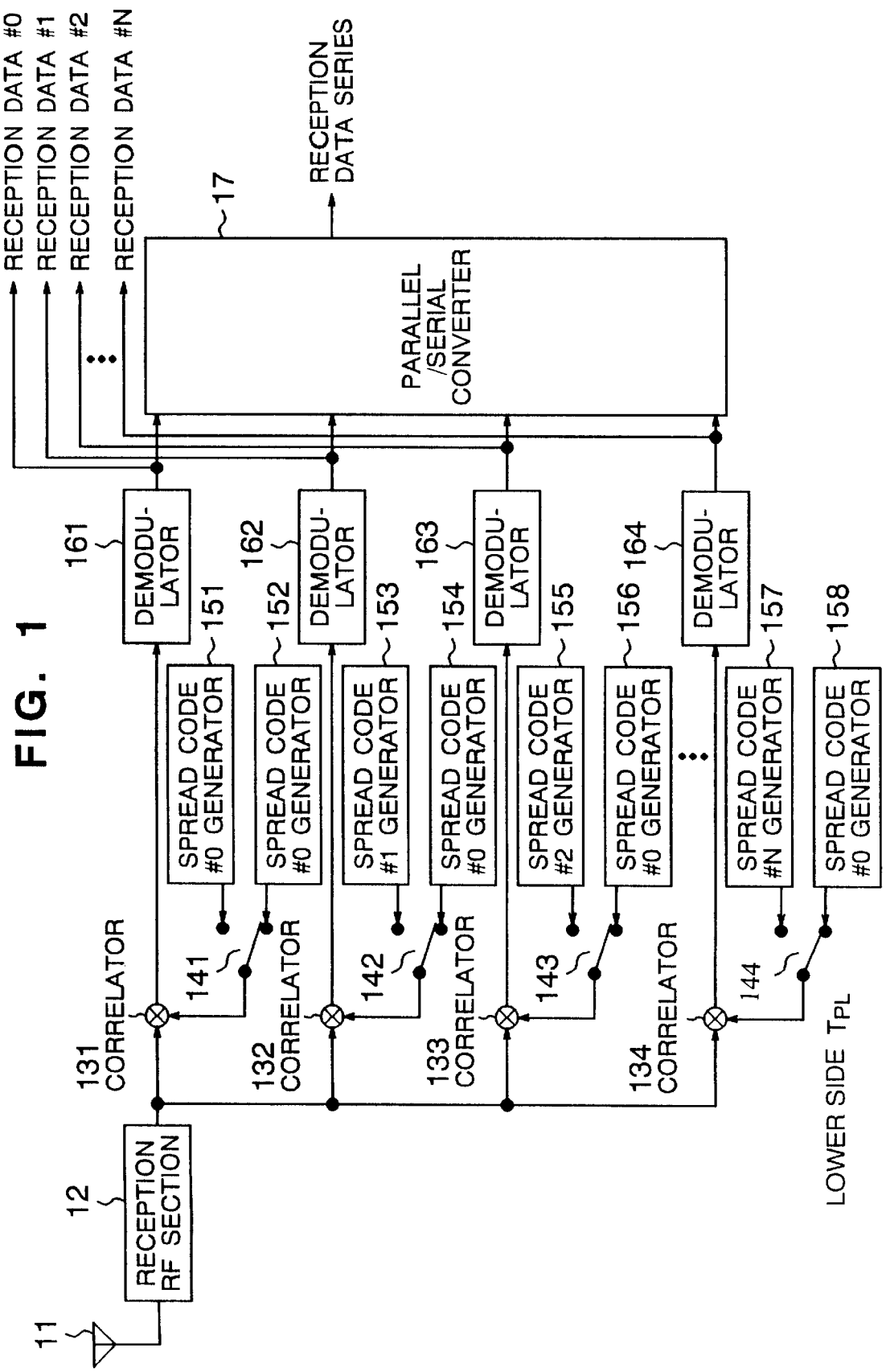
FIG. 1 is a block diagram showing a configuration of a CDMA receiving apparatus according to a first embodiment.

As shown in FIG. 1, this type receiving apparatus comprises: an antenna 11 for reception; a reception RF section 12 for down-converting the frequency of a reception signal; spread code generators 151, 153, 155 and 157 for generating spread codes allocated to channels respectively; spread code generators 152, 154, 156 and 158 for generating spread codes of the code #0 in which the pilot signal is spread; switches 141, 142, 143 and 144 for selecting spread codes generated by the spread code generators 151, 153, 155 and 157 and allocated to the channels respectively in each information data reception region and outputting the spread codes; correlators 131, 132, 133 and 134 for despreading outputs of the reception RF section 12 distributed to the channels respectively on the basis of spread codes output through the switches 141 to 144 respectively; demodulators 161, 162, 163 and 164 for coherent detection reception data while estimating the channel condition on the basis of the pilot signal; and a parallel/serial converter 17 for converting data output from the demodulators 161 to 164 respectively into a serial reception data series and outputting the reception data series.

In this receiving apparatus, a reception signal received through the antenna 11 is input to the respective correlators 131 to 134 after the frequency of the reception signal is down-converted by the reception RF section 12. Further, spread codes of the code #0 are input to the respective correlators 131 to 134 through the switches 141 to 144 in each pilot signal reception region and spread codes allocated to the respective channels are input to the respective correlators 131 to 134 through the switches 141 to 144 in each information data reception region. The respective correlators 131 to 134 despread the reception signals input by the reception RF section 12 on the basis of the input spread codes. As a result, pilot signals are extracted in each pilot signal reception region by the respective correlators 131 to 134 and reception data for the respective channels are output from the respective correlators 131 to 134 in each information data reception region.

Each of the demodulators 161 to 164 has a line estimating circuit, a coherent detection circuit, and a hard decision circuit. The demodulators 161 to 164 estimate channel conditions on the basis of the relation between the demodulation result of the pilot signal and the original phase position of the pilot signal, perform coherent detection on the reception data of the respective channels while correcting the reception data on the basis of the estimation result, and then perform hard decision to supply the hard decision result to the parallel/serial converter 17.

The parallel/serial converter 17 synthesizes a data series from the reception data demodulated in the respective channels and outputs the data series.

As described above, in this CDMA receiving apparatus, estimation of the channel conditions is performed on the basis of the pilot signal in each of the respective channels, so that the reception data of the respective channels are subjected to coherent detection while being corrected on the basis of the result of the estimation. Accordingly, unlike the conventional apparatus, information concerning channel conditions need not be distributed to the respective channels. In place thereof, the number of spread code generators in this receiving apparatus becomes larger than that in the conventional apparatus. However, because the spread code generators are formed as shift registers of an LSI, this receiving apparatus is more simplified in terms of hardware configuration and more easily formed in the form of an LSI than the conventional apparatus in which information transmission paths must be provided.

Further, when this CDMA receiving apparatus is configured so that the outputs of the demodulators 161 to 164 can be taken out individually, the CDMA receiving apparatus can be applied to single code transmission in which information is transmitted by using a single spread code. In this case, this CDMA receiving apparatus can be provided as a receiving apparatus which can be also applied to single code transmission using any one of the codes #0 to #N as a spread code.

Although FIG. 1 shows the case where spread code generators 151 and 152 for generating spread signals of the code #0 and a switch 141 are provided correspondingly to a channel 0, only one spread code generator may be provided in practical circuit design so that the other spread code generator and the switch can be omitted.

(Second Embodiment)

The CDMA receiving apparatus according to the second embodiment is a receiving apparatus corresponding to a multi-code system for transmitting a pilot signal while shifting time successively for every channels.

Figure 4:
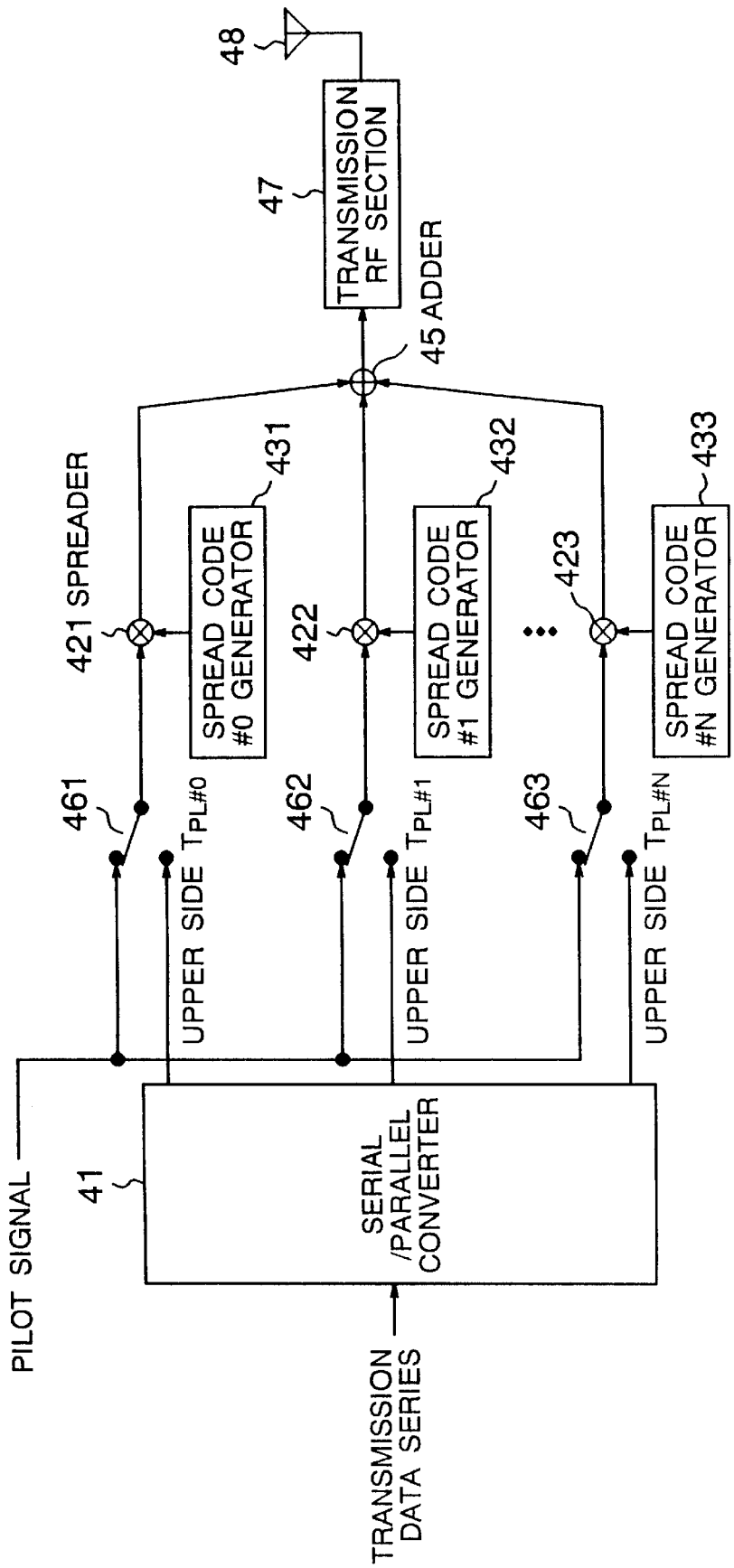
FIG. 4 is a block diagram showing the configuration of a transmitting apparatus for performing multi-code transmission according to a second embodiment.

As shown in FIG. 4, this type transmitting apparatus comprises: a serial/parallel converter 41 for dividing a transmission data series into respective channels; switches 461, 462 and 463 for selecting pilot signals in pilot signal transmission regions set correspondingly to the respective channels and selecting the outputs of the serial/parallel converter 41 in information data transmission regions set correspondingly to the respective channels; spread code generators 431, 432 and 433 for generating spread codes allocated to the respective channels; spreaders 421, 422 and 423 for spreading output signals of the switches 461 to 463 on the basis of the spread codes generated by the spread code generators 431 to 433; an adder 45 for adding up the outputs of the spreaders 421 to 423; a transmission RF section 47 for up-converting the frequency of a transmission signal output from the adder 45 into a radio frequency; and an antenna 48 used for transmission.

Figure 5:
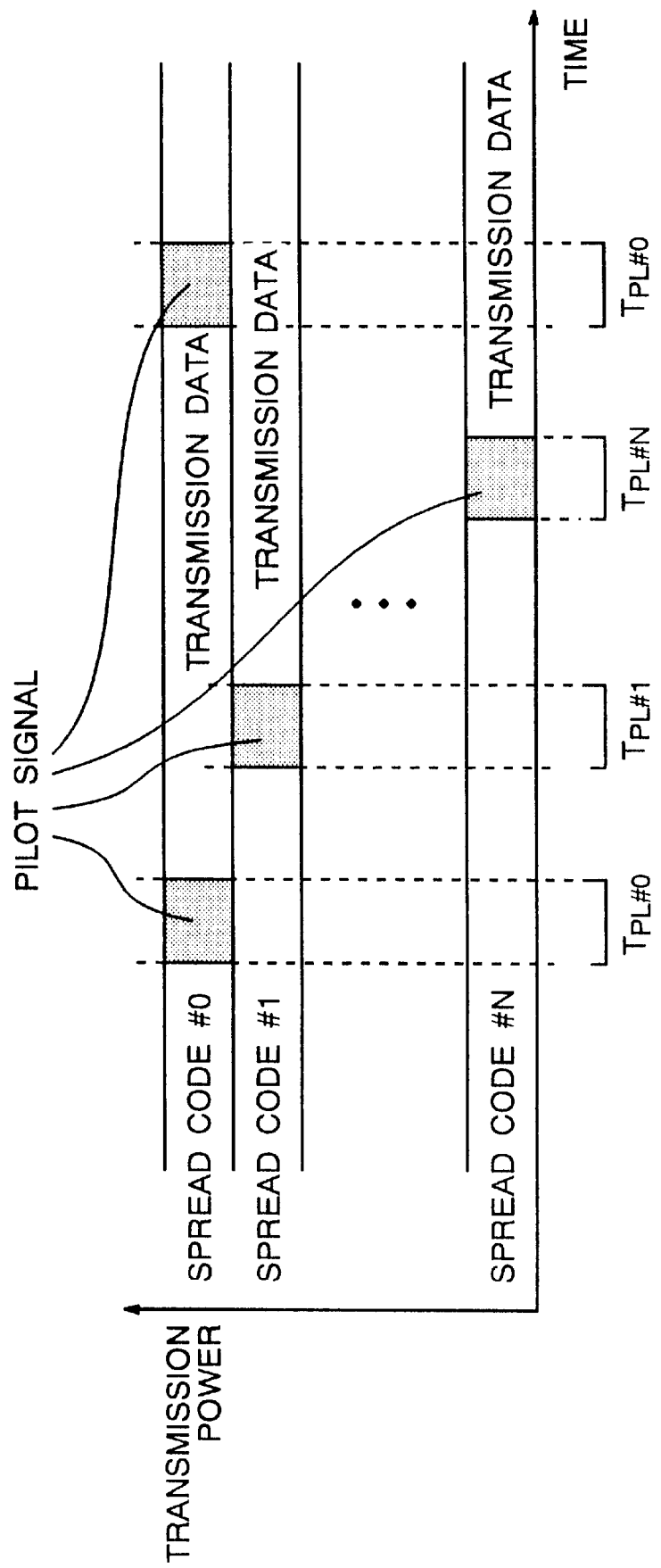
FIG. 5 shows a channel format for multi-code transmission in the second embodiment.

FIG. 5 shows a channel format for multi-code transmission in this transmitting apparatus. A pilot signal is spread on the basis of spread codes of the respective channels so that the timing of pilot signal transmission regions $T_{PL\#0}$ to $T_{PL\#N}$ in the respective channels never overlap one another.

Figure 6:
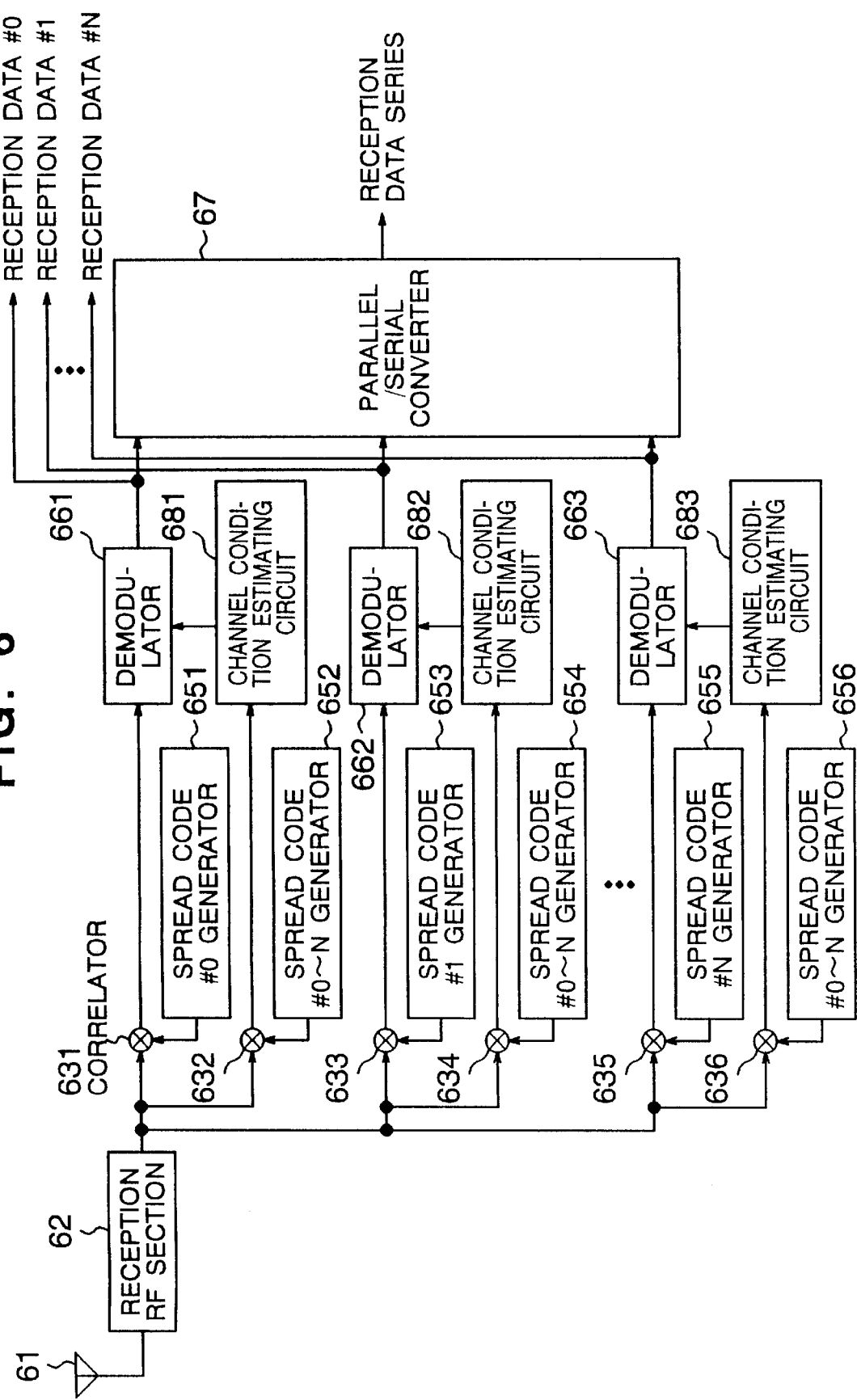
FIG. 6 is a block diagram showing the configuration of a CDMA receiving apparatus according to the second embodiment.

As shown in FIG. 6, the receiving apparatus of this type comprises: an antenna 61 for reception; a reception RF section 62 for down-converting the frequency of a reception signal; spread code generators 651, 653 and 655 for generating spread codes allocated to the respective channels; correlators 631, 633 and 635 for despreading the signal output from the reception RF section 62 and distributed to the respective channels on the basis of the spread codes generated by the spread code generators 651, 653 and 655; spread code generators 652, 654 and 656 for successively generating spread codes #0 to #N allocated to all the channels; correlators 632, 634 and 636 for despreading the signal output from the reception RF section 62 and distributed to the respective channels on the basis of the spread codes generated by the spread code generators 652, 654 and 656; channel condition estimating circuits 681, 682 and 683 for estimating channel conditions on the basis of the demodulation conditions of the pilot signal output from the correlators 632, 634 and 636; demodulators 661, 662 and 663 for demodulating reception data in the respective channels on the basis of the result of the estimation in the channel condition estimating circuits 681 to 683; and a parallel/serial converter 67 for converting the output data of the demodulators 661 to 663 into a reception data series and outputting the reception data series.

Figure 7:
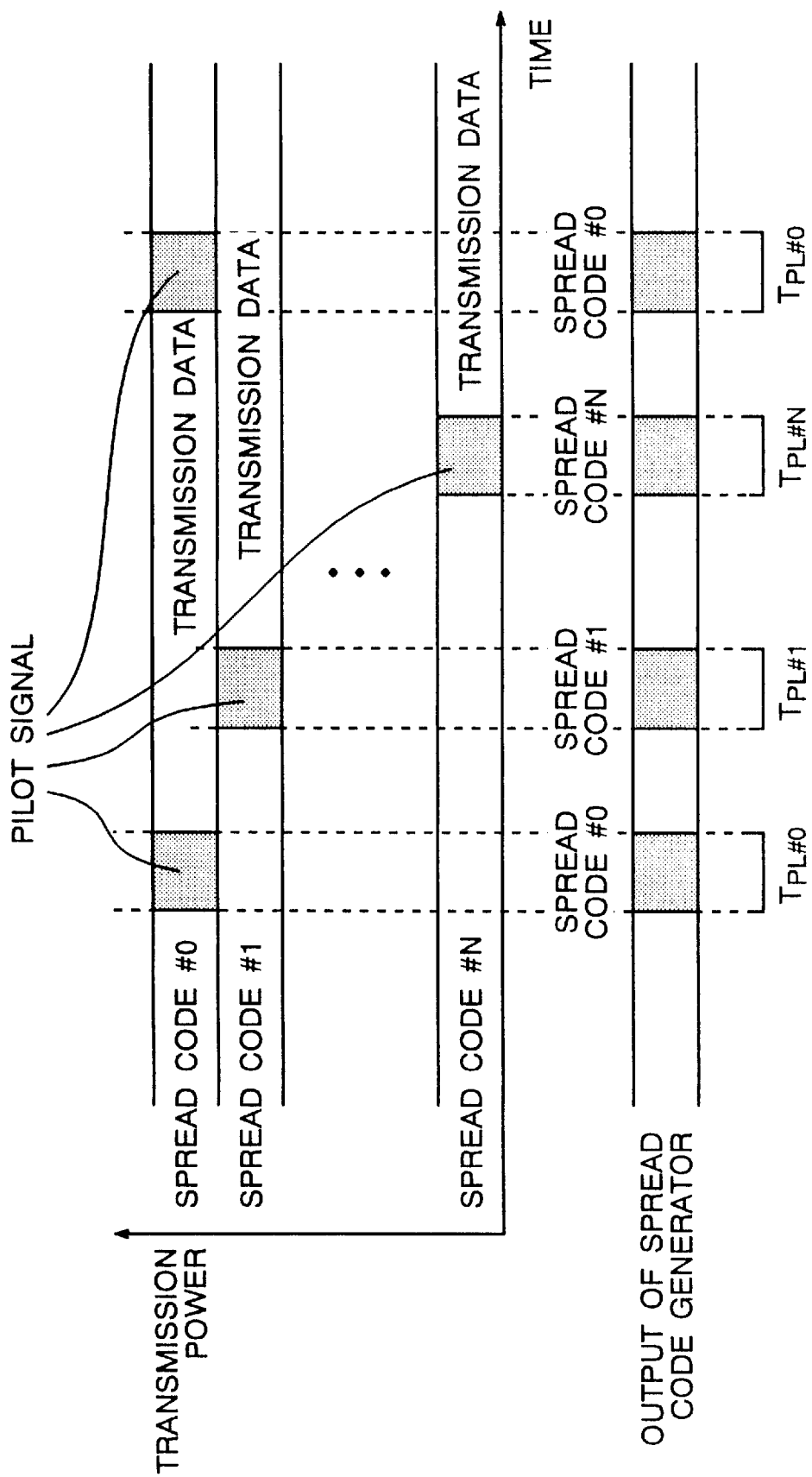
FIG. 7 is a time chart of spread code generation in the CDMA receiving apparatus in the second embodiment.
Figure 8:
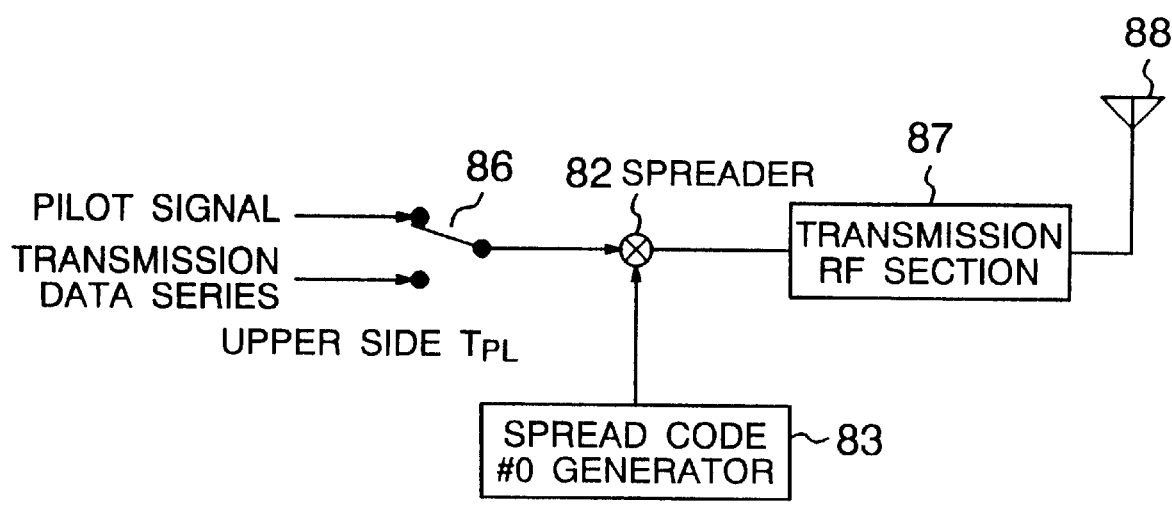
FIG. 8 is a block diagram showing the configuration of a conventional CDMA transmitting apparatus.

FIG. 7 shows the timing of spread code generation in the spread code generators 652, 654 and 656 for generating spread codes #0 to #N. The spread code of the code #0 is generated correspondingly to the pilot signal transmission region $T_{PL\#0}$ of the channel 0, the spread code of the code #1 is generated correspondingly to the pilot signal transmission region $T_{PL\#1}$ of the channel 1, and the spread code of the code #N is generated correspondingly to the pilot signal transmission region $T_{PL\#N}$ of the channel N.

In this CDMA receiving apparatus, a reception signal received through the antenna 61 is input to the respective correlators 631 to 636 after the frequency of the reception signal is down-converted by the reception RF section 62. Among these correlators, the correlators 631, 633 and 635 despread the reception signals output from the reception RF section 62 on the basis of the spread codes allocated to the respective channels and supply results of the despread to the demodulators 661 to 663.

Further, the correlators 632, 634 and 636 despread the reception signals output from the reception RF section 62 on the basis of the spread codes generated by the spread code generators 652, 654 and 656 to thereby demodulate a pilot signal transmitted through the respective channels in the all pilot signal transmission (reception) regions $T_{PL\#0}$, $T_{PL\#1}$, ... $T_{PL\#N}$ shown in FIG. 7.

The outputs of these correlators 632, 634 and 636 are input to the channel condition estimating circuits 681 to 683. The channel condition estimating circuits 681 to 683 estimate the channel conditions at respective points of time in the pilot signal reception regions $T_{PL\#0}$, $T_{PL\#1}$, ... $T_{PL\#N}$ on the basis of the demodulation conditions of the pilot signal at the respective points of time.

The channel condition estimation information obtained by the channel condition estimating circuits 681 to 683 is supplied to the demodulators 661 to 663 of the respective channels. The demodulators 661 to 663 perform coherent detection on the reception data of the respective channels while correcting the reception data on the basis of the results of the estimation and supply the results of hard decision thereof to the parallel/serial converter 67.

The parallel/serial converter 67 synthesizes one serial data series from the reception data demodulated in the respective channels and outputs the data series.

As described above, in this receiving apparatus, estimation of channel conditions is performed in each of the respective channels at short intervals on the basis of the pilot signal transmitted through all of the channels, so that the reception data of the respective channels are subjected to coherent detection while being corrected on the basis of the results of the estimation. Accordingly, this apparatus does not require any configuration for distributing information concerning channel conditions to the respective channels so as to be simplified in hardware configuration.

Further, in this receiving apparatus, the pilot signal transmitted through the other channels can be used for estimation of channel conditions in the respective channels. Accordingly, the channel conditions can be detected at short intervals, so that this apparatus can be accurately applied to the short-term change of the channel conditions.

As is obvious from the above description, the CDMA receiving apparatus according to the present invention can be simplified in hardware configuration and easily provided in the form an LSI. Further, even in the case where a plurality of LSI substrates are used, this apparatus can be produced without complex configuration.

Further, in the receiving apparatus in which channel conditions are estimated in the respective channels on the basis of the pilot signal transmitted through the all channels, the channel conditions can be detected at short intervals so that this apparatus can be accurately applied to the change of the channel conditions.

What is claimed is:

1. A CDMA (Code Division Multiple Access) receiving apparatus for demodulating data multi-code-transmitted through a plurality of channels, said apparatus comprising:

a plurality of demodulating systems for demodulating reception signals of the respective channels, each of said demodulating systems being allocated to a respective one of said channels, at least one part of said demodulating systems comprising:

first spread code generating means for generating a plurality of first spread codes respectively allocated to the plurality of channels for demodulation, said plurality of spread codes being different from one another;

second spread code generating means for generating at least one second spread code in which a pilot signal is spread; and despreading means for despreading the reception signal on the basis of the plurality of first spread codes generated by said first spread code generating means and the at least one second spread code generated by said second spread code generating means, wherein a channel condition is estimated by each of said demodulating systems individually on the basis of the pilot signal extracted by despreading so that the reception signals of the respective channels are subjected to coherent detection on the basis of a result of the estimation.

2. A CDMA receiving apparatus according to claim 1, wherein:

said pilot signal is spread on the basis of one spread code; and said second spread code generating means generates said one spread code.

3. A CDMA receiving apparatus according to claim 1, wherein:

each of said systems includes said despreading means, and selection means for selecting said spread codes generated by said first and second spread code generating means and supplying the selected spread code to said despreading means.

4. A CDMA receiving apparatus according to claim 2, wherein:

each of said systems includes said despreading means, and selection means for selecting said spread codes generated by said first and second spread code generating means and supplying the selected spread code to said despreading means.

5. A CDMA receiving apparatus according to claim 3, wherein:

said selection means supplies the spread code generated in each pilot signal reception period by said second spread code generating means to said despreading means and supplies the spread code generated in each information data reception region by said first spread code generating means to said despreading means.

6. A CDMA receiving apparatus according to claim 4, wherein:

said selection means supplies the spread code generated in each pilot signal reception period by said second spread code generating means to said despreading means and supplies the spread code generated in each information data reception region by said first spread code generating means to said despreading means.

7. A CDMA receiving apparatus according to claim 1, wherein:

said pilot signal is spread while being shifted in time on the basis of spread codes allocated to the respective channels so that said second spread code generating means successively generate the spread codes allocated to the respective channels.

8. A CDMA receiving apparatus according to claim 7, wherein:

each of said systems includes a first despreading means for despreading the reception signal on the basis of the spread code generated by said first spread code generating means, and a second despreading means for despreading the reception signal on the basis of the spread code generated by said second spread code generating means; and said channel condition is estimated on the basis of the pilot signal extracted by despreading in said second despreading means so that the signal despread by said first despreading means is subjected to coherent detection on the basis of a result of the estimation.

* * * * *